July 14, 1931. W. H. T. HOLDEN 1,814,158
SIGNALING SYSTEM
Filed April 22, 1926
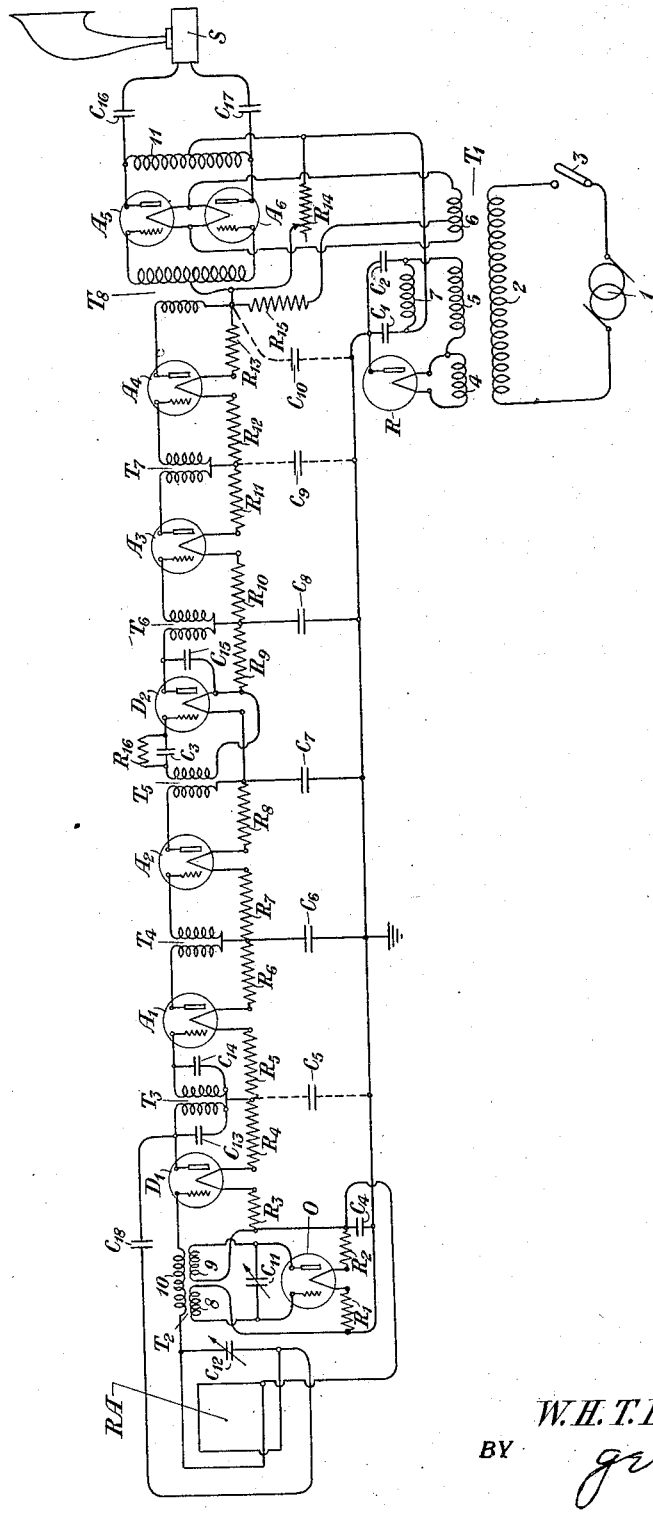
INVENTOR
W. H. T. Holden
BY
ATTORNEY Patented July 14, 1931

1,814,158

UNITED STATES PATENT OFFICE

WILLIAM H. T. HOLDEN, OF BROOKLYN, NEW YORK, ASSIGNOR TO AMERICAN TELEPHONE AND TELEGRAPH COMPANY, A CORPORATION OF NEW YORK

SIGNALING SYSTEM

Application filed April 22, 1926. Serial No. 103,922.

This invention relates to signaling systems, and more particularly to arrangements in such systems, including a plurality of vacuum tubes interconnecting an incoming circuit and an outgoing circuit, so that the circuits associated with said vacuum tubes may be energized by a source of rectified alternating current.

Heretofore, it has been the practice to connect a plurality of vacuum tubes to a plurality of batteries known as "A", "B" and "C" batteries for the energization of the circuits associated with said vacuum tubes. The "A" batteries were employed for bringing the cathodes of the vacuum tubes to the proper electron emitting temperature. The "B" batteries were employed for bringing the anodes of said vacuum tubes to suitable potentials with respect to the cathodes, and the "C" batteries were employed for providing the necessary bias for the grids of said vacuum tubes.

It has also been the practice to connect a single "B" battery to the anodes of two or more vacuum tubes which were operated at the same potentials, these anodes being connected to the "B" battery by means of a common lead. The presence of the impedance of this lead and of the "B" battery, both common to the plate circuits of the several vacuum tubes, tended to give rise to the phenomenon known as "singing" which generally interfered with the favorable transmission of signals.

It is an object of this invention to provide arrangements for eliminating the use of the "A", "B" and "C" batteries for establishing the necessary operating potentials for a plurality of vacuum tubes, and to provide instead thereof means connected to a source of alternating current through a rectifier, for obtaining equally operative potentials.

It is another object of this invention to connect a plurality of vacuum tubes of a signaling system to a plurality of resistances which are in series relationship with a source of electromotive force, so that each vacuum tube has one resistance included in its input circuit, and another resistance included in its output circuit, the drop in potential across each resistance being of the proper magnitude to energize the associated circuit.

It is another object of this invention to provide arrangements for substantially eliminating the effect known as "singing" which arises from the use of common impedance paths in the system.

While the nature of the invention will be pointed out with particularity in the appended claims, the invention itself, both as to its further objects and features, will be better understood from the detailed description hereinafter following when read in connection with the accompanying drawing showing only one embodiment of the invention.

In the drawing there is shown a signaling system which includes a receiving antenna RA, and oscillator O, a detector $D_1$, two stages of amplification, including amplifiers $A_1$ and $A_2$, another detector $D_2$, other stages of amplification including amplifiers $A_3$, $A_4$, $A_5$ and $A_6$, and a translating device such as a loud speaker S.

A source of alternating current, preferably a 110-volt sixty cycle, house lighting circuit is designated by the reference character L. This source of alternating current is connected with the primary winding 2 of a transformer $T_1$, by closing a switch 3. The secondary of the transformer $T_1$ comprises three windings 4, 5 and 6, windings 4 and 6 being low voltage windings, and winding 5 being a high voltage winding. The reference character R represents a rectifier of the electron type having an anode and a cathode, but it is to be distinctly understood that any other rectifier well known in the art may be employed instead thereof within the scope of this invention.

A simple series circuit includes the anode of the rectifier R, which is grounded, the resistance $R_1$, the cathode of the oscillator O, resistance $R_2$, the resistance $R_3$, cathode of the detector $D_1$, the resistance $R_4$, resistance $R_5$, the cathode of the amplifier $A_1$, the resistance $R_6$, the resistance $R_7$, the cathode of the amplifier $A_2$, the resistance $R_8$, the cathode of the detector $D_2$, the resistance $R_9$, the resistance $R_{10}$, the cathode of the amplifier $A_3$, the resistance $R_{11}$, the resistance $R_{12}$, the cathode of the amplifier $A_4$, the resistance $R_{13}$, the variable resistance $R_{14}$, an inductance 7, the secondary winding 5 of the transformer $T_1$ and the cathode of the rectifier R. The resistances $R_1$ and $R_2$ and the windings 8 and 9 of a transformer $T_2$ are in the input and output circuits of the oscillator O, respectively. The resistances $R_3$ and $R_4$ are included along with the receiving antenna RA and the winding 10 of the transformer $T_2$, and the primary winding of the transformer $T_3$ in the input and output circuits of the detector $D_1$, respectively. The resistances $R_5$ and $R_6$ are included along with the secondary winding of the transformer $T_3$ and the primary winding of a transformer $T_4$ in the input and output circuits of the amplifier $A_1$, respectively. The resistances $R_7$ and $R_8$ are included along with the secondary winding of the transformer $T_4$ and the primary winding of the transformer $T_5$ in the input and output circuits of the amplifier $A_2$, respectively. The resistance $R_9$ is included along with the primary winding of the transformer $T_6$ in the output circuit of the detector $D_2$. The resistances $R_{10}$ and $R_{11}$ are included along with the secondary winding of the transformer $T_6$ and the primary winding of the transformer $T_7$ in the input and output circuits of the amplifier $A_3$, respectively. The resistances $R_{12}$ and $R_{13}$ are included along with the secondary winding of the transformer $T_7$ and the primary winding of a transformer $T_8$ in the input and output circuits of an amplifier $A_4$, respectively.

The secondary winding 4 of the transformer $T_1$ is used for heating the cathode of the rectifier R, whereas the secondary winding 6 of the transformer $T_1$ is used for heating the cathodes of the amplifiers $A_5$ and $A_6$ which are in parallel relationship with each other. Thus, the cathodes of the rectifier R and of the vacuum tubes of the last stages of amplification in the signaling system are supplied with alternating current for furnishing the necessary energy therefor. Let it be noted that it is one of the features of this invention to heat the cathodes of the vacuum tubes in the last stages of amplification in a signaling system by alternating current. The noise produced in the system by the use of alternating current to heat the cathodes in the last stages of amplification is practically negligible.

A resistance $R_{15}$ is common to the input circuits of the amplifiers $A_5$ and $A_6$, each of these input circuits including the resistance $R_{15}$, one-half of the secondary winding of the transformer $T_8$, the grid and cathode of the amplifier and one-half of the secondary winding 6 of the transformer $T_1$. If, by virtue of the size, the diameter and the material employed for the various cathodes, any of the cathodes would receive too much current, it is within the scope of this invention to connect resistances to shunt these cathodes to thereby lessen the current flowing through these cathodes.

The inductance 7 and two condensers $C_1$ and $C_2$ comprise a filter which is preferably a low-pass filter. This filter is connected to the rectifier R for rendering the series circuit, which includes the resistances $R_1$ to $R_{14}$, inclusive, as free from alternating current components as possible. Inasmuch as the cut-off frequency of this filter, which may be, for example, 30 cycles, is lower than the frequency of the source of alternating current 1, no frequency of the source 1, or produced therefrom by the action of the rectifier, will be below the cut-off frequency of the filter, and therefore the series circuit which includes resistances $R_1$ to $R_{14}$ will be substantially free from alternating current components.

The resistances $R_1$ to $R_{14}$, inclusive, are of such magnitudes that the difference in potential across each of said resistances is sufficient to provide the proper potential for each associated circuit. Thus, the difference in potential across each of the resistances $R_1$ and $R_2$, $R_3$ and $R_4$, $R_5$ and $R_6$, $R_7$ and $R_8$ will supply the necessary potentials for the input and output circuits, respectively, of the oscillator O, the detector $D_1$, the amplifier $A_1$ and the amplifier $A_2$. The detector $D_2$ has a resistance $R_{16}$ and a condenser $C_3$, in parallel with each other and in series with the secondary winding of the transformer $T_5$, in the input circuit thereof. The resistance $R_9$ in the output circuit of the detector $D_2$ supplies the potential necessary to operate the output circuit thereof. The difference in potential across each of the resistances $R_{10}$ and $R_{11}$, $R_{12}$ and $R_{13}$ supply the necessary potentials for the input and output circuits, respectively of the amplifiers $A_3$ and $A_4$.

The condenser $C_4$ connects the point common to resistances $R_2$ and $R_3$ to the grounded anode of the rectifier R. The condenser $C_6$ connects the point common to resistances $R_6$ and $R_7$ to the grounded anode of the rectifier R. Furthermore, the condenser $C_8$ connects the point common to the resistances $R_9$ and $R_{10}$ to the grounded anode of the rectifier R. It will be understood, however, that other condensers such as $C_5$, $C_7$, $C_9$ and $C_{10}$, shown in dotted lines, may be employed in this invention for bridging various points in the series circuit including resistances $R_1$ and $R_{14}$ to the grounded anode of the rectifier R.

These condensers $C_4$ to $C_{10}$, inclusive, are employed for substantially eliminating the effect known as "singing" which arises from the use of common impedance paths. It will be understood, however, that it is within the scope of this invention to employ any combinations of inductances and condensers in place of the condensers shown herein to accomplish this object.

The windings 8 and 9 of the transformer $T_2$, in the input and output circuits, respectively, of the oscillator O, are coupled together. A variable condenser $C_{11}$ is connected across the terminals of these windings so that the circuit including the windings 8 and 9, and the condenser $C_{11}$ may have negligible reactance at a frequency which is characteristic of the oscillator O.

The frequency of this oscillator, which may be, for example, 660 kilocycles, beats with the carrier frequency received by the receiving antenna RA on which are superposed one or both side bands corresponding to low frequency signals. A variable condenser $C_{12}$ is connected to the receiving antenna RA to render the antenna selective to a particular frequency such as, for example, 610 kilocycles. The detector $D_1$ beats the frequency of the oscillator O with the frequency received by the receiving antenna RA, on which are superposed side bands corresponding to low frequency signals. Consequently an intermediate frequency results, which has a frequency equal to the difference between the frequency of the oscillator O and the frequency received by the receiving antenna RA. This intermediate frequency will also have superposed thereon the side bands received by the receiving antenna RA. Condensers $C_{13}$ and $C_{14}$ are bridged across the terminals of the primary and secondary windings of the transformer $T_3$ so as to by-pass all frequencies except the intermediate frequency upon which the side bands corresponding to the low frequency signals are superposed.

The intermediate frequency and its side bands are amplified by the amplifiers $A_1$ and $A_2$. This intermediate frequency and its side bands are then impressed on the input circuit of the detector $D_2$, and, as is well known in the art, there will appear in the output circuit of the detector $D_2$ signals corresponding to the side bands superposed on the carrier received by the receiving antenna RA. A condenser $C_{15}$ is connected between the anode and cathode of the detector $D_2$ in order to by-pass all frequencies above the range employed as low frequency signals. These low frequency signals are then amplified by amplifiers $A_3$, $A_4$, $A_5$ and $A_6$ in a manner well known in the art. Condensers $C_{16}$ and $C_{17}$ are connected between the anodes of amplifiers $A_5$ and $A_6$, respectively, and the loud speaker S, so that only the low frequency signals may pass to the loud speaker S.

In my copending application, Serial No. 70,157, filed November 19, 1925, I have disclosed and claimed an arrangement including a source of rectified current connected to a plurality of resistances set up so as to supply the potentials required to energize the circuits of a plurality of vacuum tubes.

While the invention has been disclosed in one particular signaling system, it is to be understood that it is capable of embodiment in other signaling systems and in widely varied organizations of such systems without departing from the spirit of the invention and the scope of the appended claims.

What is claimed is:

1. In a radio receiving system, in combination, a plurality of three-electrode vacuum tubes, a plurality of transformers interconnecting said vacuum tubes, a source of alternating current, a rectifier, and a plurality of resistances in series relationship with each other, said resistances being supplied with current rectified by said rectifier, two of said resistances being provided for each of the various vacuum tubes, one of which is connected to the input circuit of each vacuum tube and the other to the output circuit of each vacuum tube, the two resistances associated with any one of the vacuum tubes being different from those associated with any of the other vacuum tubes, said resistances applying the required potentials to the circuits of said vacuum tubes.

2. In a radio receiving system, in combination, a source of alternating current, means for rectifying the alternating current therefrom, a plurality of vacuum tubes, a plurality of transformers interconnecting said vacuum tubes, and a plurality of resistances in series relationship with each other for furnishing from the rectified current the potentials required by said vacuum tubes, each of said vacuum tubes being provided with two of said resistances, the two resistances associated with any one of the vacuum tubes being different from those associated with any of the other vacuum tubes, each of the input circuits of the various vacuum tubes including one of said resistances, each of the output circuits of the various vacuum tubes including another of said resistances.

3. A signaling system comprising a plurality of vacuum tubes, a plurality of transformers interconnecting said vacuum tubes, a plurality of resistances in series relationship with each other, said resistances being separated into pairs, each pair being provided for one of the various vacuum tubes, one of the resistances of each pair being connected to the input circuit of the corresponding vacuum tube and the other to its output circuit, means for sending direct current through said resistances, said resistances being employed for supplying the potentials required by the input and output circuits of said vacuum tubes, and means for substantially eliminating common impedance paths for signals passing through the system.

4. A system for receiving and detecting low frequency signals modulated on a high frequency wave comprising a plurality of three-electrode vacuum tubes, a plurality of transformers interconnecting said vacuum tubes, a source of alternating current, a rectifier, said rectifier rectifying the alternating current, and means for supplying the proper potentials for operating said vacuum tubes from current rectified by said rectifier, said means consisting of a plurality of resistances in series relationship with each other, two of said resistances corresponding to each of said vacuum tubes, one of which is connected to the input circuit of each vacuum tube and the other to the output circuit of each vacuum tube, the two resistances connected to the respective input and output circuits of any one of the vacuum tubes being distinct from those connected with the input and output circuits of any of the other vacuum tubes, each resistance having a predetermined drop in potential across its terminals.

5. In a radio receiving system, in combination, a plurality of three-electrode vacuum tubes and transformer coupling means interconnecting said vacuum tubes, a source of rectified alternating current, means comprising a plurality of resistances connected in series for supplying the proper potentials for operating said vacuum tubes from said source of rectified alternating current, two of said resistances being provided for at least one of the vacuum tubes, one of which resistances is connected to the input circuit of said vacuum tube and the other to the output circuit of said vacuum tube, the said two resistances associated with said one of the vacuum tubes being different from those associated with any of the other vacuum tubes.

In testimony whereof, I have signed my name to this specification this 21st day of April, 1926.

WILLIAM H. T. HOLDEN.